United States Patent [19]

Cramer

[11] Patent Number: 4,927,040
[45] Date of Patent: May 22, 1990

[54] PLASTIC DRUM AND METHOD OF MAKING

[75] Inventor: Harley L. Cramer, Swanton, Ohio

[73] Assignee: Owens-Illinois Plastic Products Inc., Toledo, Ohio

[21] Appl. No.: 390,004

[22] Filed: Aug. 7, 1989

[51] Int. Cl.$^5$ ............................................. B65D 21/00
[52] U.S. Cl. .................................. 220/5 R; 220/85 R
[58] Field of Search .................. 220/5 R, 85 R, 85 F, 220/86 R

[56] References Cited

U.S. PATENT DOCUMENTS

| | | | |
|---|---|---|---|
| 2,656,314 | 10/1953 | Osterheld | 220/85 R |
| 3,370,737 | 2/1968 | Ainslie | 220/5 R |
| 4,793,491 | 12/1988 | Wolf et al. | 220/5 R X |

Primary Examiner—Steven M. Pollard

[57] ABSTRACT

A plastic drum comprising a side wall, a bottom wall and a top wall having an opening therein and a plastic stem fusion bonded to the inner surface of the base wall in general alignment with the opening such that a dispensing tube can be inserted through the opening with the lower end of the tube engaging the stem to hold the dispensing tube in position adjacent the bottom wall. The plastic drum is made by heating the base of the plastic stem at an elevated temperature and inserting the heated stem into contact with the inner surface of the base of the drum as the hot drum is removed from the plastic forming machine where it has been blown outwardly from a hollow parison in conformity with a mold.

4 Claims, 1 Drawing Sheet

PLASTIC DRUM AND METHOD OF MAKING

BACKGROUND AND SUMMARY OF THE INVENTION

Plastic drums comprise large hollow blow molded plastic articles having a side wall, a bottom wall and a top wall with one or more openings therein. In dispensing the contents of the drum, it is common to insert a dispensing tube in the drum and it is desirable to have a dispensing tube held in substantially vertical position so that substantially all of contents of the container may be drawn out of the drum.

As far as the inventor is aware no one has ever been able to successfully make any kind of a plastic drum with means for orienting and supporting the dispensing tube.

Accordingly, among the objectives of the present invention are to provide a plastic drum having a stem on the inner surface of the base wall and a method of making this plastic drum which will effectively guide the dispensing tube; which can be made at low cost; and which is simple in construction.

In accordance with the invention, a plastic drum comprising a side wall, a bottom wall and a top wall having an opening therein and a plastic stem fusion bonded to the inner surface of the base wall in general alignment with the opening such that a dispensing tube can be inserted through the opening with the lower end of the tube engaging the stem to hold the dispensing tube in positron adjacent the bottom wall. The plastic drum is made by heating the base of the plastic stem at an elevated temperature and inserting the heated stem into contact with the inner surface with the base of the drum as the hot drum is removed from the plastic forming machine where the drum has been blown outwardly from a hollow parison in conformity with a mold.

DESCRIPTION

Figure 1:
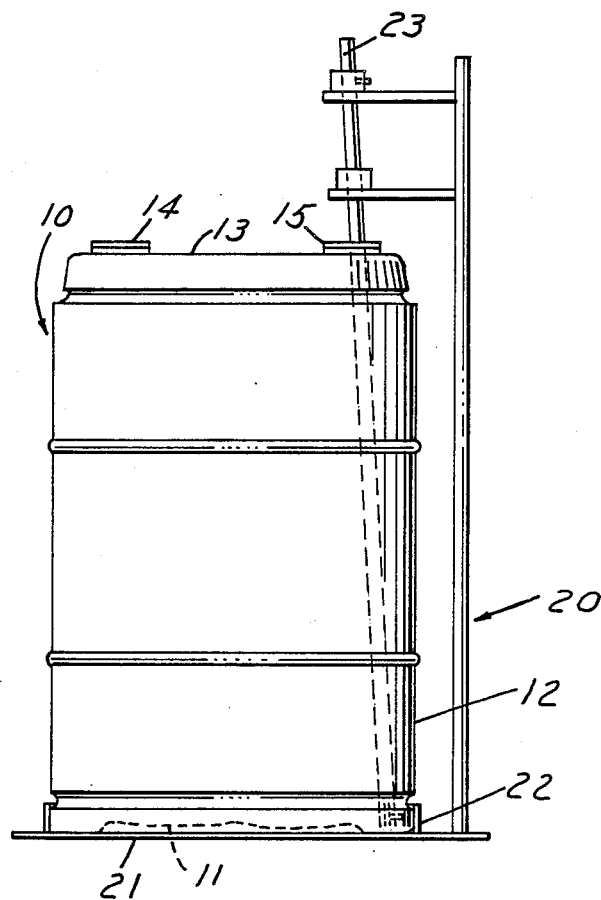
FIG. 1 is an elevational view of a plastic drum shown supported in a fixture during the method of making the drum.
Figure 2:
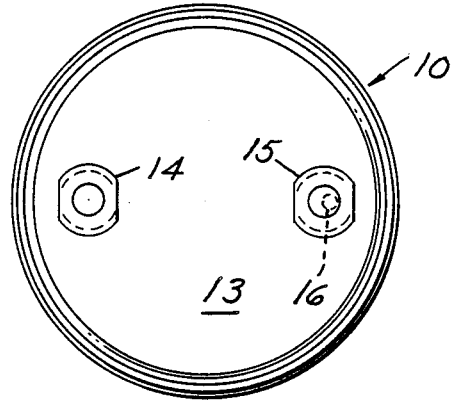
FIG. 2 is a plan view of the drum.
Figure 3:
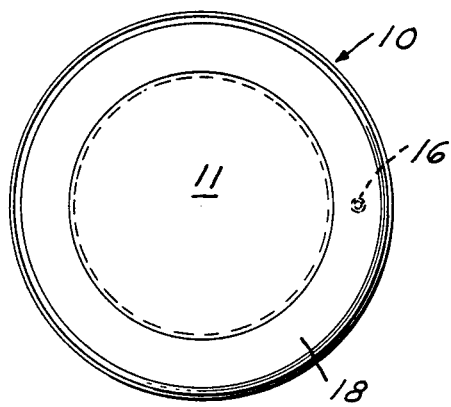
FIG. 3 is a bottom plan view of the drum.

Referring to FIGS. 1-5, a drum 10 includes a bottom wall 11, a side wall 12 and a top wall 13 having openings 14, 15 therein. In accordance with the invention, a plastic stem 16 is fusion bonded to the inner surface 17 of the annular portion 18 of the base wall 11 at its lowest point. The stem 16 functions to guide a dispensing tube 19 inserted through opening 15 to guide the lower end of the tube to maintain it generally vertical.

Figure 4:
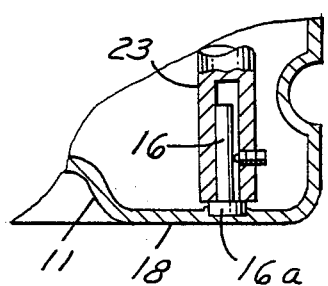
FIG. 4 is a fragmentary sectional view of a portion of the drum on an enlarged scale.
Figure 5:
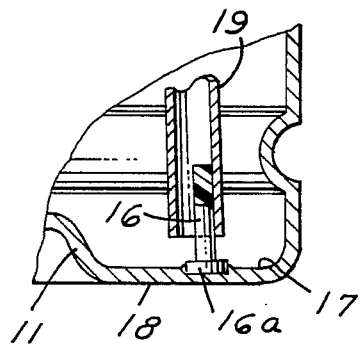
FIG. 5 is a fragmentary sectional view similar to FIG. 4 showing the drum after it is completed and holding a dispensing tube in aligned position.

Referring to FIGS. 1 and 4, the plastic drum embodying the invention is made by conventional blow molding methods by blowing a hollow parison outwardly between the halves of a mold which pinches the top and bottom walls of the parison and the parison is blown outwardly against the confines of the mold. After the drum is formed, it is immediately placed in a fixture 20 which includes a base 21 and peripheral support 22 and a tool 23 having the stem 16 fixed thereto is inserted to force the lower end of the stem against the wall 18. Before being inserted through the opening, the plastic stem 16 is heated to an elevated temperature so that when it is forced against the surface 17, it becomes embedded in the wall 18 which is at an elevated temperature. Preferably, the end of the stem 16 is enlarged as at 16a and is heated by placing the enlarged portion 16a against a hot plate producing a melt-back and then forcing the end of the stem against the base surface.

In a case where the drum is made of high density polyethylene, the stem is also made by high density polyethylene. In such a case, the end of the stem is placed against a hot plate at a temperature of about 510° F. producing a "melt-back" of 1/32" so that the temperature of the stem at "melt-back" is about 300° F. When the stem is inserted into the drum, the bottom 18 is at about 250° F.

It can thus be seen that there has been provided a drum having means in the form of a stem in the bottom of the container which aids in orientation and supports for a dispensing tube and which is made at a low cost.

I claim:

1. A plastic drum comprising
   a side wall,
   a bottom wall and
   a top wall having an opening therein and
   a plastic stem fusion bonded to the inner surface of the bottom wall in general alignment with the opening such that a dispensing tube can be inserted through the opening with the lower end of the tube engaging the stem to hold the dispensing tube in position adjacent the bottom wall.

2. The drum set forth in claim 1 wherein the end of said stem is enlarged and embedded in the drum.

3. The method of making a drum which comprises blow molding a plastic drum having a side wall, a bottom wall and a top wall having an opening therein fusion bonding a plastic stem to the inner surface of the bottom wall by heating the base of a plastic stem at an elevated temperature and inserting the heated stem into contact with the inner surface of the bottom wall of the drum in general alignment with said openings, as it is removed from the plastic forming machine where it has been blown outwardly from a hollow parison in conformity with a mold.

4. The method set forth in claim 3 wherein said stem is enlarged prior to heating.

* * * * *